United States Patent
Sirhani (10) Patent No.: US 12,430,452 B2
(45) Date of Patent: Sep. 30, 2025

(54) SYSTEMS, DEVICES, AND METHODS FOR DETERMINING AND REGISTERING AUTHORIZED ROLES

(71) Applicant: SAUDI ARABIAN OIL COMPANY, Dhahran (SA)

(72) Inventor: Ahmad F. Sirhani, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 225 days.

(21) Appl. No.: 18/051,412

(22) Filed: Oct. 31, 2022

(65) Prior Publication Data

US 2024/0143799 A1 May 2, 2024

(51) Int. Cl.
*G06F 21/60* (2013.01)
(52) U.S. Cl.
CPC ................. *G06F 21/604* (2013.01)
(58) Field of Classification Search
CPC ..................................... G06F 21/604
See application file for complete search history.

(56) References Cited

U.S. PATENT DOCUMENTS

| | | | |
|---|---|---|---|
| 7,650,633 B2 | 1/2010 | Whitson | |
| 10,044,722 B2 | 8/2018 | El Khoury et al. | |
| 10,721,239 B2 | 7/2020 | Koottayi et al. | |
| 11,184,238 B1* | 11/2021 | Lu | H04L 41/0893 |
| 2002/0144142 A1 | 10/2002 | Shohat | |
| 2011/0131572 A1* | 6/2011 | Elyashev | G06F 9/45533 718/1 |
| 2018/0365025 A1* | 12/2018 | Almecija | G06F 3/0482 |
| 2019/0068627 A1 | 2/2019 | Thampy | |
| 2021/0064771 A1* | 3/2021 | Julaih | G06F 21/6218 |
| 2021/0099453 A1 | 4/2021 | Cohen | |
| 2021/0234902 A1* | 7/2021 | Chandana | G06F 21/554 |
| 2021/0342421 A1 | 11/2021 | Maier et al. | |

FOREIGN PATENT DOCUMENTS

JP          2020524855 A       8/2020

* cited by examiner

*Primary Examiner* — William R Korzuch
*Assistant Examiner* — Matthias Habtegeorgis
(74) *Attorney, Agent, or Firm* — Vorys, Sater, Seymour and Pease LLP (57) ABSTRACT

According to an embodiment of the present disclosure, an authorized roles tool includes an analyzer to determine a type of request received from a user including an unregistered action, an unregistered permission, or a combination thereof, a predictor to predict, using a data management model, a role with which to associate the unregistered action, the unregistered permission, or the combination thereof, and a registrar to register the unregistered action, the unregistered permission, or the combination thereof to the role.

15 Claims, 3 Drawing Sheets

SYSTEMS, DEVICES, AND METHODS FOR DETERMINING AND REGISTERING AUTHORIZED ROLES

FIELD OF THE DISCLOSURE

The present description relates generally to ensuring the security and protection of systems, computer applications and data of organizations and, more particularly, to systems, devices and methods for determining authorized roles associated with the systems, computer applications and data of organizations.

BACKGROUND OF THE DISCLOSURE

The term "enterprise resources", as used herein, collectively refers to the systems, computer applications and data of an organization. The enterprise resources may include multiple systems, multiple computer applications, multiple data sets, or a combination thereof. An organization may use an enterprise resource planning (ERP) system to manage the multiple systems, computer applications and data sets. To ensure the security and protection of the enterprise resources, the ERP system can grant or deny full or partial access to specified systems, computer applications, or data sets based on a role of a user requesting the access. The complexity of the task associated with defining the roles within the organization varies depending upon organization-dependent factors, such as a size of the organization, a number of levels of security within the organization, and a number of owners associated with one or more systems, computer applications, or data sets.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the purpose of this summary is to present some concepts of the disclosure in a simplified form prior to the more detailed description that is presented hereinafter.

According to an embodiment of the present disclosure, an authorized roles tool includes an analyzer to determine a type of request received from a user including an unregistered action, an unregistered permission, or a combination thereof, a predictor to predict, using a data management model, a role with which to associate the unregistered action, the unregistered permission, or the combination thereof, and a registrar to register the unregistered action, the unregistered permission, or the combination thereof to the role.

In an embodiment, a trainer generates the data management model and is to receive a set of unregistered objects and a set of authorized roles, where an unregistered object of the set of unregistered objects includes one or more unregistered actions, unregistered permissions, or a combination thereof, and where an authorized role of the set of authorized roles is associated with one or more registered actions, registered permissions, or a combination thereof. The trainer is to analyze, using a machine learning technique, the set of unregistered objects and the set of authorized roles, and generate the data management model based on the analysis.

In another embodiment of the present disclosure, a method includes determining a type of request received from a user includes an unregistered action, an unregistered permission, or a combination thereof, predicting, using a data management model, a role with which to associate the unregistered action, the unregistered permission, or the combination thereof, and registering the unregistered action, the unregistered permission, or the combination thereof, to the role.

In an embodiment, the method further includes generating, by a trainer, the data management model, where generating the data management model includes receiving a set of unregistered objects and a set of authorized roles, where an unregistered object of the set of unregistered objects includes one or more unregistered actions, unregistered permissions, or a combination thereof, and where an authorized role of the set of authorized roles is associated with one or more registered actions, registered permissions, or a combination thereof. The method further includes analyzing, using a machine learning technique, the set of unregistered objects and the set of authorized roles, and generating the data management model based on the analysis.

In another embodiment of the present disclosure, a non-transitory computer-readable medium (CRM) stores computer-executable instructions, which, when executed by a processor, cause the processor to determine a type of request received from a user includes an unregistered action, an unregistered permission, or a combination thereof, predict, using a data management model, a role with which to associate the unregistered action, the unregistered permission, or the combination thereof, and register the unregistered action, the unregistered permission, or the combination thereof, to the role.

Any combinations of the various embodiments and implementations described herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments described herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to ensuring the security and protection of systems, computer applications and data of organizations and, more particularly, to systems, devices and methods for determining roles associated with the systems, computer applications and data sets of an organization and registering the roles with one or more ERP systems of the organization. According to various embodiments, an authorized role tool predicts a role with which to associate an unregistered action, permission, or a combination thereof, associated with a system, computer application, a data set, or a combination thereof, of an organization and registers the action, permission, or the combination thereof, to the role. An unregistered action or unregistered permission, as used herein, is a type of request that is generated in response to a user requesting access to one or more systems, computer applications, or data sets with which a role of the user has not been previously associated as described below. By automatically determining the role to associate with the unregistered action or permission, the authorized role tool enhances a responsiveness of the ERP system to changes within the ERP system by reducing an amount of time accrued while waiting on one or more owners of a system, computer application, or data set associated with the unregistered action or permission to deny or authorize the role.

As described above, an organization uses an ERP system to manage enterprise resources, which include one or more systems, computer applications, or data sets. To ensure the security and protection of the enterprise resources, the ERP system grants or denies full or partial access to specified systems, computer applications, or data sets based on a data management model. A system, as used herein, may include hardware components, software components, or a combination thereof, for performing specified operations of an organization. Non-limiting examples of a system include, a computer system, a network system, or a combination thereof, as described below with respect to FIG. 4. A computer application, as used herein, may include any type of application, program, or automated process having computer-executable instructions, which, when executed, enable access to specified operations or data. Non-limiting examples of a computer application include a word processing application, a spreadsheet application, a presentation application, or a videoconferencing application.

A data management model, as used herein, uses owners, roles, actions, permissions, or a combination thereof to determine whether to grant or deny access to the specified systems, computer applications, or data sets. A user, as used herein, is a person who the organization grants access to one or more portions of the enterprise resources. Non-limiting examples of the one or more portions include one or more systems, one or more subsystems of a system, one or more computer applications, one or more features of a computer application, one or more data sets of the data of the organization, or a combination thereof. The access may be any type of access, such as, but not limited to, generating, sharing, modifying, viewing, deleting, logging into, or moving the one or more portions.

An action, as used herein, indicates an attempt to use one or more functions associated with a system, a computer application, a data set, or a combination thereof. Non-limiting examples of actions include connecting to a network, connecting to a computer system coupled to a sub-network, launching a computer application, launching a module of a computer application, or viewing a data set. A permission, as used herein, indicates whether the user has access to the system, the computer application, the data set, or the combination thereof, associated with the action. Non-limiting examples of permissions include read, write, append, erase, or permit the action. The action may be associated with multiple permissions that vary depending on the role attempting the action. A role, as used herein, indicates one or more action-permission relationships (e.g., action-permissions) that a user is assigned with respect to one or more portions of the enterprise resources. In a non-limiting example, a role represents one or more action-permissions that enables a user to perform responsibilities associated with a job of the user. In a non-limiting example, a user having a role of content viewer has an ability to read data using a computer application and another user having a role of content creator has an ability to read and write data using the computer application. An owner, as used herein, is responsible for managing one or more portions of the enterprise resources. Non-limiting examples of owners include a network manager, a computer application manager, a data set manager, a manager or a department of an organization, or a data security professional.

As described above, the complexity of the task associated with defining and assigning roles within the organization varies depending upon organization-dependent factors, such as the size of the organization, the number of levels of security within the organization, and the number of owners associated with one or more systems, computer applications, or data sets. In a non-limiting example, an authorized role tool predicts a role with which to associate with an unregistered action-permission associated with a system, a computer application, a data set, or a combination thereof, of an organization and registers the action-permission to the role. In accordance with certain embodiments described herein, the authorized role tool uses a data management model generated using a machine learning technique to automate the task of defining and assigning the roles within the organization.

Figure 1:
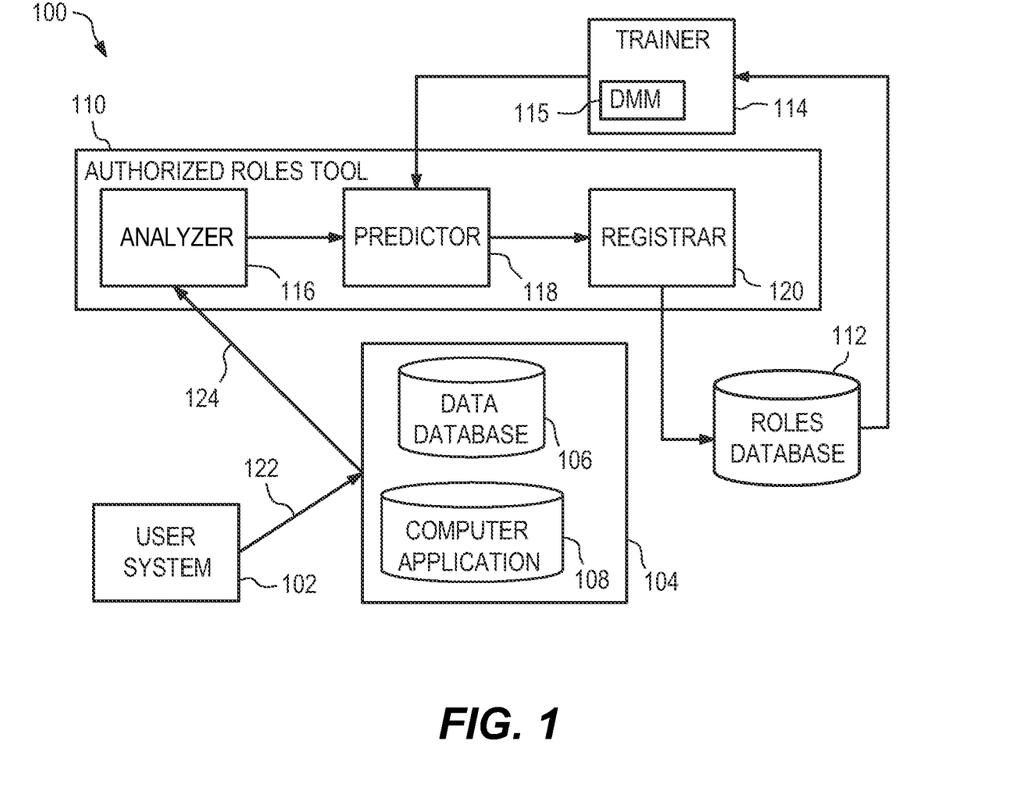
FIG. 1 is a block diagram of a system for determining authorized roles in accordance with certain embodiments.

FIG. 1 is a block diagram of a system 100 for determining authorized roles in accordance with certain embodiments. In a non-limiting example, the system 100 includes an authorized roles tool 110 for determining and registering authorized roles. The system 100 is an ERP system, for example. Using data from sources such as a user system 102, a system 104, a trainer 114, and the like, the authorized roles tool 110 can determine a type of request received from a user including an unregistered action, an unregistered permission, or a combination thereof, predict, using a data management model, a role with which to associate the unregistered action, the unregistered permission, or the combination thereof, and register the unregistered action, the unregistered permission, or the combination thereof to the role.

In a non-limiting example, one or more of the data from the user system 102, the system 104, or the trainer 114 is retrieved by the authorized roles tool 110 from a computer-readable media, such as data database 106 or other computer-readable media as described below with respect to FIG. 4. In another non-limiting example, one or more of the data from the user system 102, the system 104, or the trainer 114 is received by the authorized roles tool 110 via an input device or via a network interface, as described below with respect to FIG. 4. In various embodiments, an output of the authorized roles tool 110 is stored to a computer-readable media, such as roles database 112, which stores the roles of an organization and the one or more action-permissions that the role enables with respect to one or more portions of the enterprise resources of the organization.

The data from the user system 102, the system 104, or a combination thereof, includes data signals generated by the user system 102, the system 104, or the combination thereof. In various embodiments, the user system 102 attempts to access the system 104 using a data signal 122. In a non-limiting example, the system 104 transmits a data signal 124 that includes a type of request the user system 102 is requesting via the data signal 122 to the authorized roles tool 110 to determine whether the type of request includes an unregistered action, an unregistered permission, of a combination thereof. In another non-limiting example, the user system 102 transmits the data signal 124 that includes a type of request the user system 102 is requesting via the data signal 122 to the authorized roles tool 110 to determine whether the type of request includes an unregistered action, an unregistered permission, of a combination thereof. The data of the trainer 114 includes a data management model 115 used by the authorized roles tool 110.

Within the authorized roles tool 110, in a non-limiting example, an analyzer 116 determines whether a type of request received from a user of the user system 102 includes an unregistered action, an unregistered permission, or a combination thereof, and generates an indication that the type of request includes an unregistered object. A predictor 118 of the authorized roles tool 110 receives the indication that the type of request includes the unregistered object, and predicts, using the data management model 115, a role with which to associate the unregistered action, the unregistered permission, or the combination thereof. In a non-limiting example, the predictor 118 receives the data management model 115 from the trainer 114. A registrar 120 of the authorized roles tool 110 receives the prediction and registers the unregistered action, the unregistered permission, or the combination thereof to the role.

Figure 2:
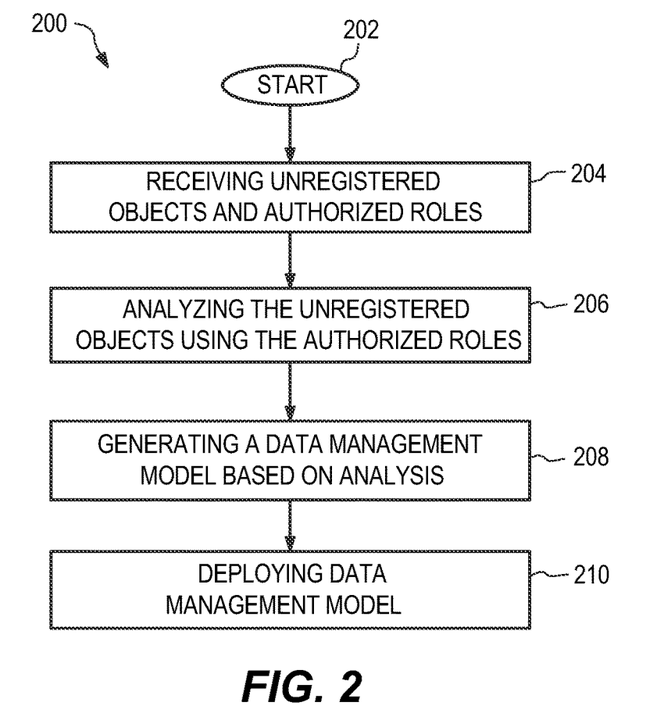
FIG. 2 is a flow diagram of a method for training a data management model in accordance with certain embodiments.

FIG. 2 is a flow diagram of a method 200 for training a data management model, in accordance with certain embodiments. In a non-limiting example, the method 200 is used by a trainer to train one or more machine learning models of an authorized roles tool for determining and registering authorized roles of one or more ERP systems. The method 200 is used by an authorized roles tool as described with respect to FIG. 1 or 3, for example. The method 200 includes starting (block 202), receiving unregistered objects and authorized roles (block 204), analyzing the unregistered objects using the authorized roles (block 206), generating the data management model based on the analysis (block 208), and deploying the data management model (block 210).

Starting block 202 includes, but is not limited to, receiving an input from a user, the present system, another system, or a combination thereof, that indicates the present system is to perform the method 200. In a non-limiting example, the unregistered object includes one or more sets of unregistered objects, where an unregistered object of the one or more sets of unregistered objects includes one or more unregistered actions, unregistered permissions, or a combination thereof. In another non-limiting example, the authorized roles includes one or more sets of authorized roles, where an authorized role of the one or more sets of authorized roles is associated with one or more registered actions, registered permissions, or a combination thereof. Receiving the unregistered objects and authorized roles at block 204 includes, but is not limited to, receiving the unregistered objects or the authorized roles from one or more computer-readable medium, input devices, network interfaces, or a combination thereof, associated with the present system, another system, or a combination thereof.

Analyzing the set of unregistered objects and the set of authorized roles at block 206 includes using one or more machine learning techniques. In a non-limiting example, the one or more machine learning techniques uses linear regression to analyze and correlate the unregistered objects with authorized roles. The method 200 further includes assigning, based on the correlations, weights to relationships between the unregistered objects and the authorized roles. In a non-limiting example, generating the data management model 115 based on the analysis at block 208 includes incorporating the weights into the data management model 115. The method 200 may use a variety of machine learning techniques to train the one or more machine learning models that are provided to the authorized roles tool. The machine learning techniques may include, but are not limited to, Logistic Regression (LR), Naïve Bayes (NB), K-Nearest Neighbor (KNN), Decision Tree (DT), Ada Boost (AB), Deep Neural Network (DNN), Random Forest (RF), K-means, hierarchical clustering, Gaussian mixtures, or other machine learning methods. Those skilled in the art will appreciate that the application of machine learning techniques and machine learning models may include additional techniques and techniques not expressly described herein without departing from the scope of this description.

Deploying the data management model at block 210 includes, but is not limited to, storing the data management model to a computer-readable medium that is accessible to an authorized roles tool, transmitting the data management model to a system including an authorized roles tool, or a combination thereof. In a non-limiting example, one or more actions, one or more permissions, or a combination thereof, associated with one or more authorized roles is modified by another method. For example, an owner of a system, a computer application, a data set, or a combination thereof, may modify (e.g., delete, change) the one or more actions, the one or more permissions, or a combination thereof, associated with one or more authorized roles or may create (e.g., add) one or more authorized roles associated with one or more actions, one or more permissions, or the combination thereof. In response to the owner storing the modifications or additions to a roles database, an authorized roles tool may generate an indicator that indicates the method 200 is to start, and the authorized roles used at block 204 will include the modifications or additions. Including the modifications or additions results in deployment of an updated data management model at block 210.

The blocks of the method 200 may be executed by one or multiple computer applications. The blocks of the method 200 may be executed in any order, and in any combination, and may individually be executed one or more times. As a non-limiting example, block 204 may be executed six (6) times followed by three (3) executions of block 206, followed by executions of the sequence of blocks 208 then 204 then 206.

In certain embodiments, a system uses the method 200 to automate the development life cycle for determining and registering authorized roles associated with an unregistered system, an unregistered computer application, an unregistered data set, or a combination thereof, and the system may be referred to as an authorized roles tool. A development environment may include a model of an operating environment to which the unregistered system, the unregistered computer application, the unregistered data set, or the combination thereof is to be deployed. The development environment simulates interactions between the unregistered system, the unregistered computer application, the unregistered data set, or the combination thereof, and one or more portions of the operating environment of the organization, to determine an impact that the unregistered system, the unregistered computer application, the unregistered data set, or the combination thereof, may have on the one or more portions of the operating environment. The simulation may generate one or more sets of unregistered objects to be used at block 204 as well as an indicator that indicates the method 200 is to start.

In a non-limiting example, the method 200 includes determining an authorized role with which to associate an unregistered object or the one or more sets of unregistered objects. The method 200 further includes registering the unregistered object to the role. In a non-limiting example, the method 200 includes storing the unregistered object with the role to a computer-readable medium. In another non-limiting example, the method 200 includes determining an owner of the unregistered system, the unregistered computer application, the unregistered data set, or the combination thereof, based on the one or more authorized roles associated with the one or more sets of unregistered objects.

Figure 3:
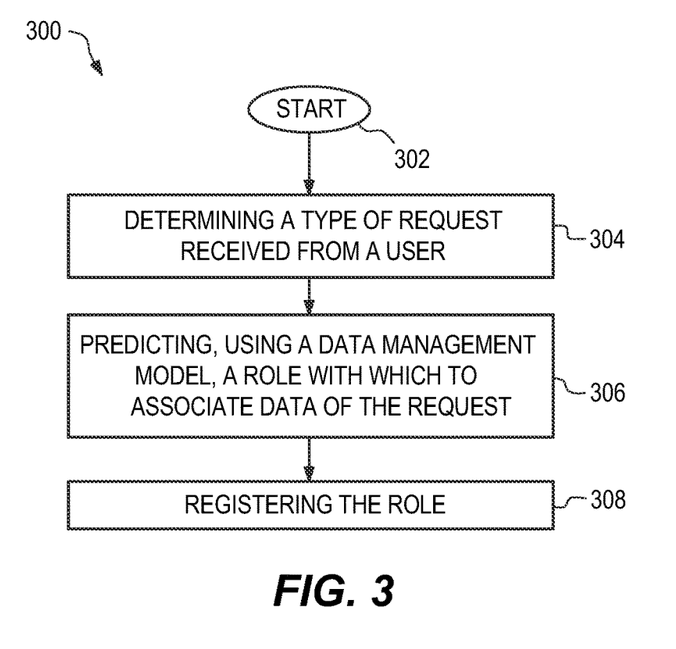
FIG. 3 is a flow diagram of a method for determining authorized roles in accordance with certain embodiments.

FIG. 3 is a flow diagram of a method 300 for determining and registering authorized roles in accordance with certain embodiments. In a non-limiting example, the method 300 is used by an authorized roles tool for determining and registering authorized roles of one or more ERP systems. The method 300 is used by an authorized roles tool as described with respect to FIG. 1 or 2, for example. The method 300 includes starting (block 302), determining a type of request received from a user (block 304), predicting, using a data management model, a role with which to associate data of the request (block 306), and registering the role (block 308).

Starting block 302 includes, but is not limited to, receiving an input from a user, the present system, another system, or a combination thereof, which indicates the present system is to perform the method 300. Determining the type of request received from the user at block 304 includes, but is not limited to receiving the type of request from one or more computer-readable medium, input devices, network interfaces, or a combination thereof, associated with the present system, another system, or a combination thereof. In a non-limiting example, determining the type of request received from the user at block 304 includes determining whether the type of request includes an unregistered action, an unregistered permission, or a combination thereof, and generating an indicator that indicates the type of request includes the unregistered action, the unregistered permission, or the combination thereof.

In a non-limiting example, in response to the indicator indicating the type of request includes the unregistered action, the unregistered permission, or the combination thereof, predicting, using the data management model, the role with which to associate data of the request is performed at block 306. In certain embodiments, the data management model includes one or more machine learning models received from a trainer or accessed via a computer-readable medium, as described above with respect to FIG. 1 or 3. In a non-limiting example, registering the role at block 308 includes storing the unregistered action, the unregistered permission, or the combination thereof with the role predicted at block 306 to a computer-readable medium.

The blocks of the method 300 may be executed by one or multiple computer applications. The blocks of the method 300 may be executed in any order, and in any combination, and may individually be executed one or more times. As a non-limiting example, block 304 may be executed six (6) times followed by three (3) executions of block 306, followed by executions of block 304 two (2) times then executions of block 308 two (2) times, block 306 seven (7) times, and block 308 eight (8) times.

System 100, method 200, and method 300 may each be partially or wholly implemented, in any combination, as part of an authorized roles tool or multiple authorized roles tools used by an organization for ensuring security and protection of systems and data of the organization generally.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 45 U.S.C. § 101 (such as a propagating electrical or electromagnetic signal per se). As an example and not by way of limitation, a computer-readable storage media may include a semiconductor-based circuit or device or other IC (such as, for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions specified in the flowchart block or blocks.

Figure 4:
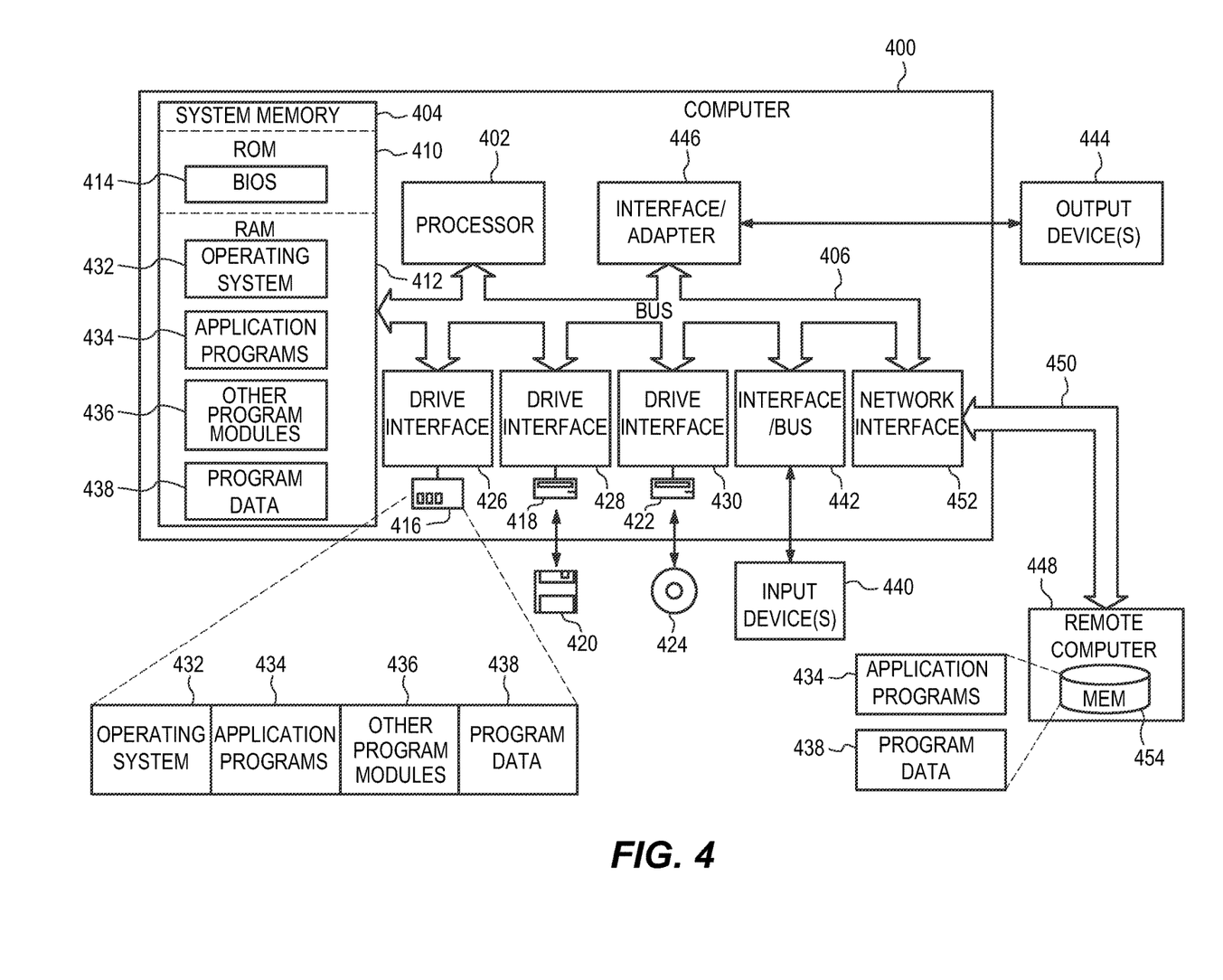
FIG. 4 is a block diagram of a computer system that can be employed to execute a system for determining authorized roles in accordance with certain embodiments.

FIG. 4 is a block diagram of a computer system that can be employed to execute a system for analyzing ransomware threat intelligence in accordance with certain embodiments described. Computer system 400 can be implemented on one or more general purpose networked computer systems, embedded computer systems, routers, switches, server devices, client devices, various intermediate devices/nodes or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. Dual microprocessors and other multiprocessor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 440, respectively. The drives and associated computer-readable media provide nonvolatile storage of data, data structures, and computer-executable instructions for computer system 400. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 412, including operating system 432, one or more computer application programs 434, other program modules 436, and program data 438. In some examples, the computer application programs 434 can include the computer application 108, the authorized roles tool 110, the trainer 114, the analyzer 116, the predictor 118, the registrar 120, and the program data 438 can include the data stored to the data database 106, the roles stored to the roles database 112. The computer application programs 434 and program data 438 can include functions and methods programmed to perform the method 200 to train a data management model and the method 300 to determine the authorized roles, such as shown and described herein.

A user may enter commands and information into computer system 400 through one or more input devices 440, such as a pointing device (e.g., a mouse, touch screen), keyboard, microphone, joystick, game pad, scanner, and the like. For instance, the user can employ input device 440 to edit or modify the authorized roles tool 110, the trainer 114, the one or more machine learning models, and/or data stored to the roles database 112. These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, a monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all the elements described relative to computer system 400. The logical connections, schematically indicated at 450, can include a local area network (LAN) and a wide area network (WAN). When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, computer application programs 434 or program data 438 depicted relative to computer system 400, or portions thereof, may be stored in a remote memory storage device 454.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, blocks, operations, elements, and/or components, but do not preclude the presence or addition of one or more other features, integers, blocks, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the description has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the description without departing from the essential scope thereof. Therefore, it is intended that the invention not be limited to the particular embodiments described, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. An authorized roles tool comprising:
  a memory and a processor for executing application programs stored on the memory, the application programs further comprising:
  an analyzer operable to determine a type of request received from a user including an unregistered action, an unregistered permission, or a combination thereof;
  a trainer operable to generate a data management model based on analysis of one or more unregistered actions, unregistered permissions, or a combination thereof using a machine learning technique;
  a predictor operable to predict, using the data management model, a role with which to associate the unregistered action, the unregistered permission, or the combination thereof; and
  a registrar to register the unregistered action, the unregistered permission, or the combination thereof to the role.

2. The authorized roles tool of claim 1, wherein the trainer is operable to:
  receive a set of unregistered objects and a set of authorized roles, wherein an unregistered object of the set of unregistered objects includes the one or more unregistered actions, unregistered permissions, or a combination thereof, and wherein an authorized role of the set of authorized roles is associated with one or more registered actions, registered permissions, or a combination thereof;
  analyze, using a machine learning technique, the set of unregistered objects and the set of authorized roles; and
  generate the data management model based on the analysis.

3. The authorized roles tool of claim 2, wherein the trainer is operable to:
  determine an authorized role with which to associate the unregistered object; and
  register the unregistered object to the role.

4. The authorized roles tool of claim 3, wherein to register the unregistered object to the role, the trainer is operable to store the unregistered object with the role to a computer-readable medium.

5. The authorized roles tool of claim 1, wherein to register the unregistered action, the unregistered permission, or the combination thereof to the role, the authorized roles tool is operable to store the unregistered action, the unregistered permission, or the combination thereof with the role to a computer-readable medium.

6. A method comprising:
  determining a type of request received from a user includes an unregistered action, an unregistered permission, or a combination thereof;
  generating a data management model based on analysis of a set unregistered objects and a set of authorized roles using a machine learning technique, wherein the set of unregistered objects includes one or more unregistered actions, unregistered permissions, or a combination thereof;
  predicting, using data management model, a role with which to associate the unregistered action, the unregistered permission, or the combination thereof; and
  registering the unregistered action, the unregistered permission, or the combination thereof, to the role.

7. The method of claim 6, wherein generating the data management model comprises:
  receiving the set of unregistered objects and the set of authorized roles, and wherein an authorized role of the set of authorized roles is associated with one or more registered actions, registered permissions, or a combination thereof;
  analyzing, using the machine learning technique, the set of unregistered objects and the set of authorized roles; and
  generating the data management model based on the analysis.

8. The method of claim 7, wherein analyzing, using the set of unregistered objects and the set of authorized role, further comprises:
  determining an authorized role with which to associate the unregistered object; and
  registering the unregistered object to the role.

9. The method of claim 8, wherein registering the unregistered object to the role further comprises storing the unregistered object with the role to a computer-readable medium.

10. The method of claim 6, wherein registering the unregistered action, the unregistered permission, or the combination thereof to the role, further comprises storing the unregistered action, the unregistered permission, or the combination thereof with the role to a computer-readable medium.

11. A non-transitory computer-readable medium storing computer-executable instructions, which, when executed by a processor, cause the processor to:
  determine a type of request received from a user includes an unregistered action, an unregistered permission, or a combination thereof;
  generate, using a trainer, a data management model based on analysis of one or more unregistered actions, unregistered permissions, or a combination thereof using a machine learning technique;
  predict, using the data management model, a role with which to associate the unregistered action, the unregistered permission, or the combination thereof; and
  register the unregistered action, the unregistered permission, or the combination thereof to the role.

12. The computer-readable medium of claim 11, wherein the processor is operable to cause the trainer to:
  receive a set of unregistered objects and a set of authorized roles, wherein an unregistered object of the set of unregistered objects includes the one or more unregistered actions, unregistered permissions, or a combination thereof, and wherein an authorized role of the set of authorized roles is associated with one or more registered actions, registered permissions, or a combination thereof;
  analyze, using a machine learning technique, the set of unregistered objects and the set of authorized roles; and
  generate the data management model based on the analysis.

13. The computer-readable medium of claim 12, wherein the processor is operable to cause the trainer to:

determine an authorized role with which to associate the unregistered object; and register the unregistered object to the role.

14. The computer-readable medium of claim 13, wherein to register the unregistered object to the role, the processor is operable to cause the trainer is to store the unregistered object with the role to a computer-readable medium.

15. The computer-readable medium of claim 11, wherein to register the unregistered action, the unregistered permission, or the combination thereof to the role, the processor is operable to store the unregistered action, the unregistered permission, or the combination thereof with the role to a computer-readable medium.

* * * * *